(No Model.) 5 Sheets—Sheet 1.
W. McCLAVE.
GRATE FOR BOILER OR OTHER FURNACES.
No. 529,291. Patented Nov. 13, 1894.
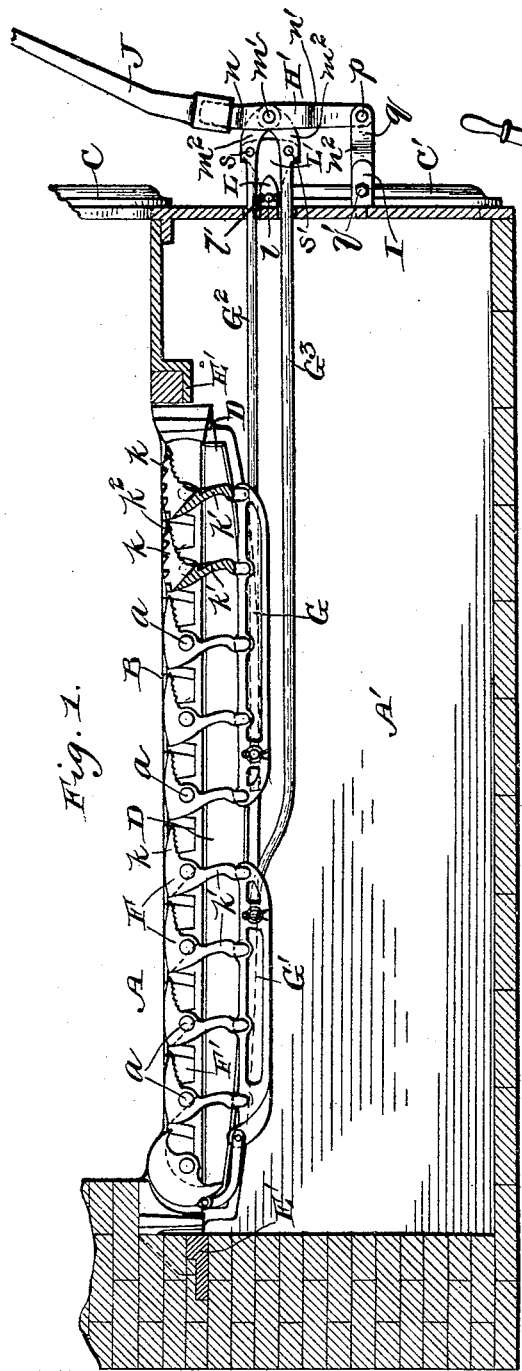
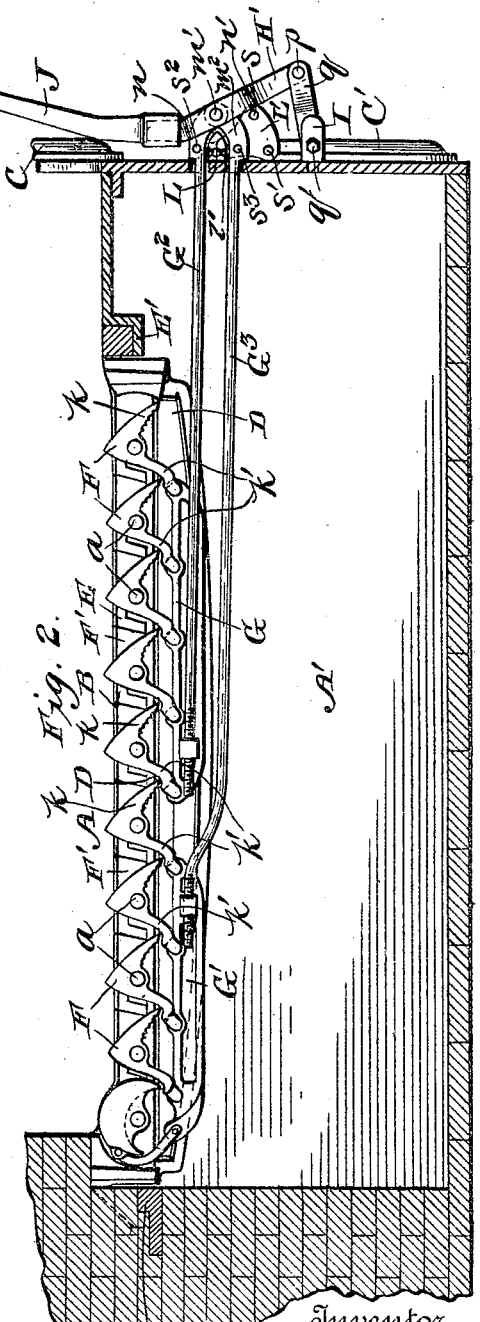
Witnesses
Inventor
William McClave
by Mason, Fenwick and Lawrence
his Attorneys.

(No Model.) 5 Sheets—Sheet 2.
W. McCLAVE.
GRATE FOR BOILER OR OTHER FURNACES.
No. 529,291. Patented Nov. 13, 1894.
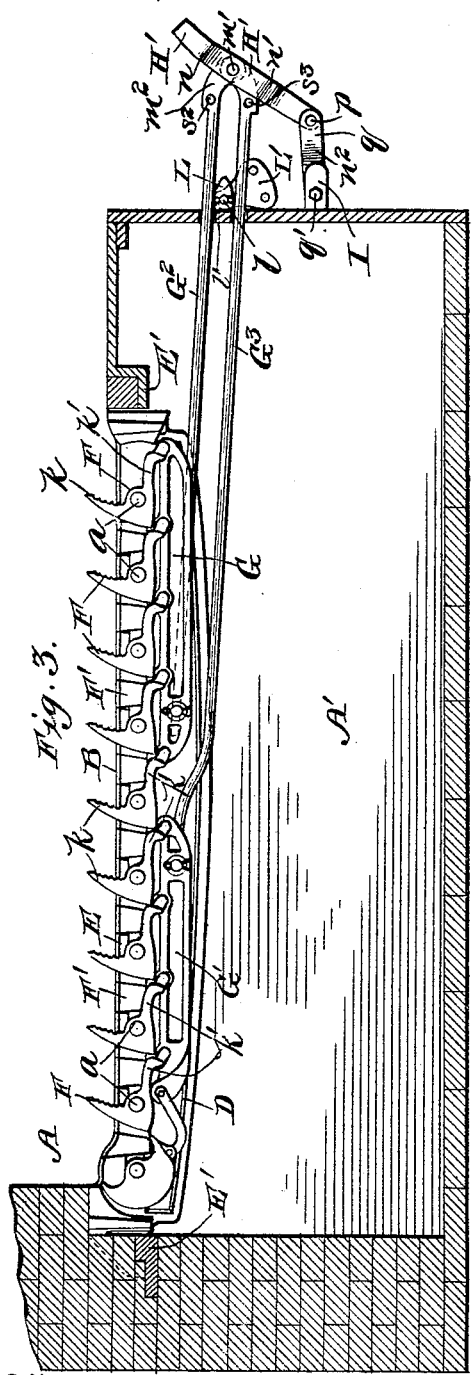
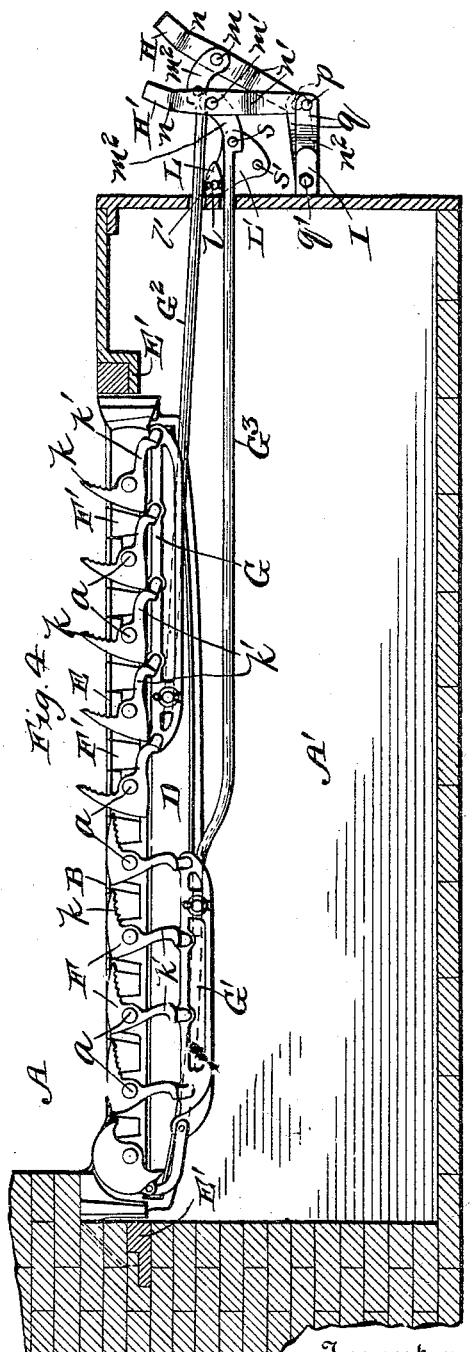

(No Model.) 5 Sheets—Sheet 3.
W. McCLAVE.
GRATE FOR BOILER OR OTHER FURNACES.
No. 529,291. Patented Nov. 13, 1894.
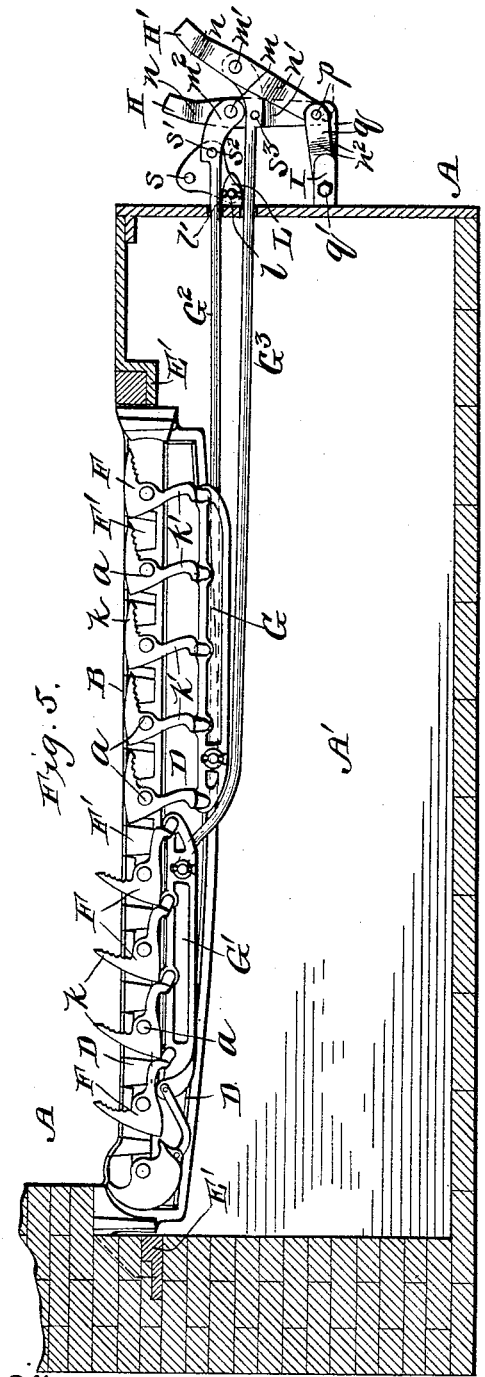
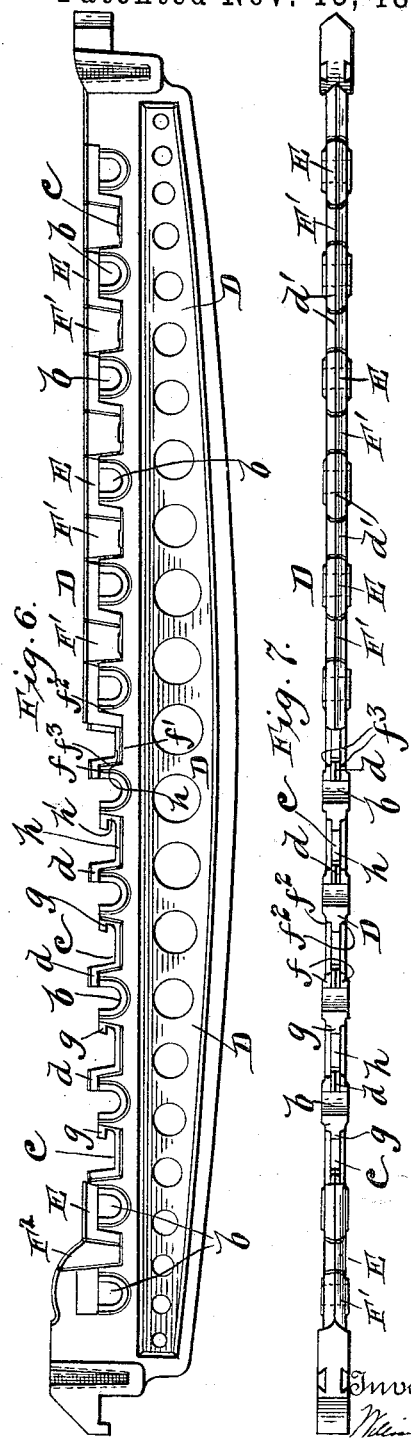
Witnesses
Inventor (No Model.) 5 Sheets—Sheet 4.
W. McCLAVE.
GRATE FOR BOILER OR OTHER FURNACES.
No. 529,291. Patented Nov. 13, 1894.
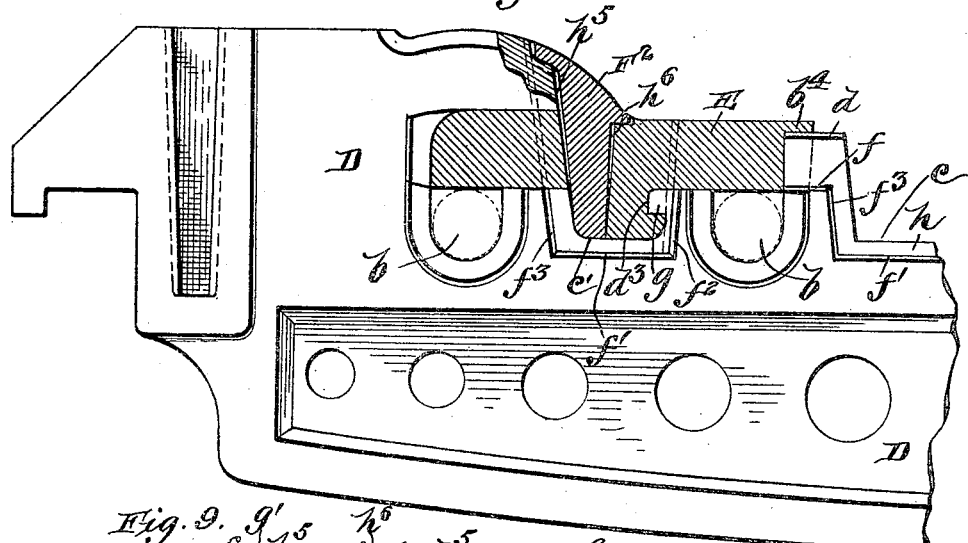
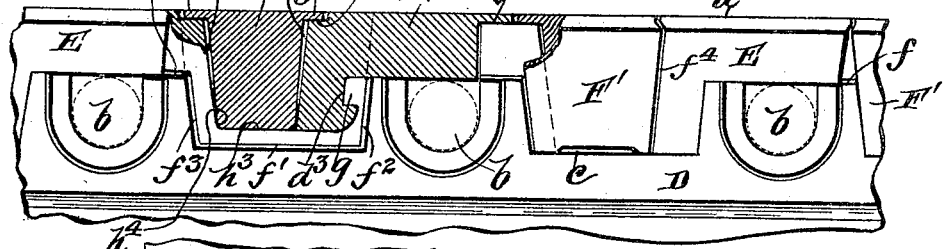
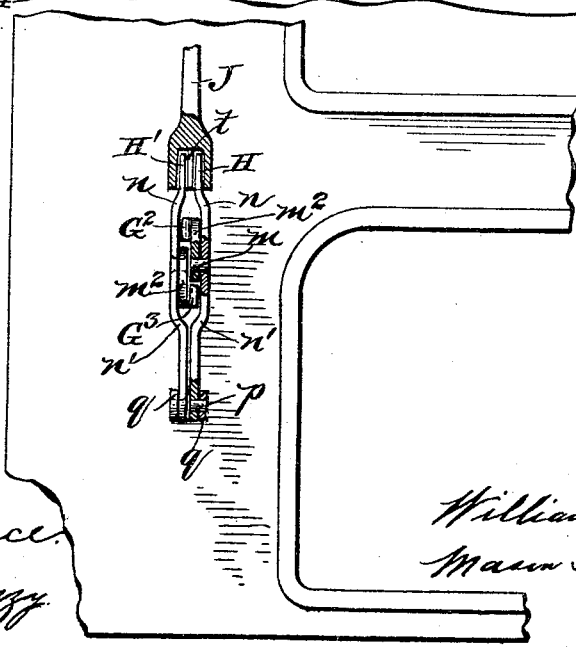
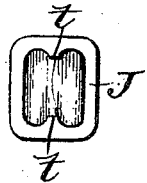
Witnesses
Severance
W. Harry Muzzy
Inventor
William McClave
by Mason Fenwick Lawrence
his Attorneys
THE NORRIS PETERS CO., PHOTO-LITHO., WASHINGTON, D. C.

(No Model.) 5 Sheets—Sheet 5.
W. McCLAVE.
GRATE FOR BOILER OR OTHER FURNACES.
No. 529,291. Patented Nov. 13, 1894.
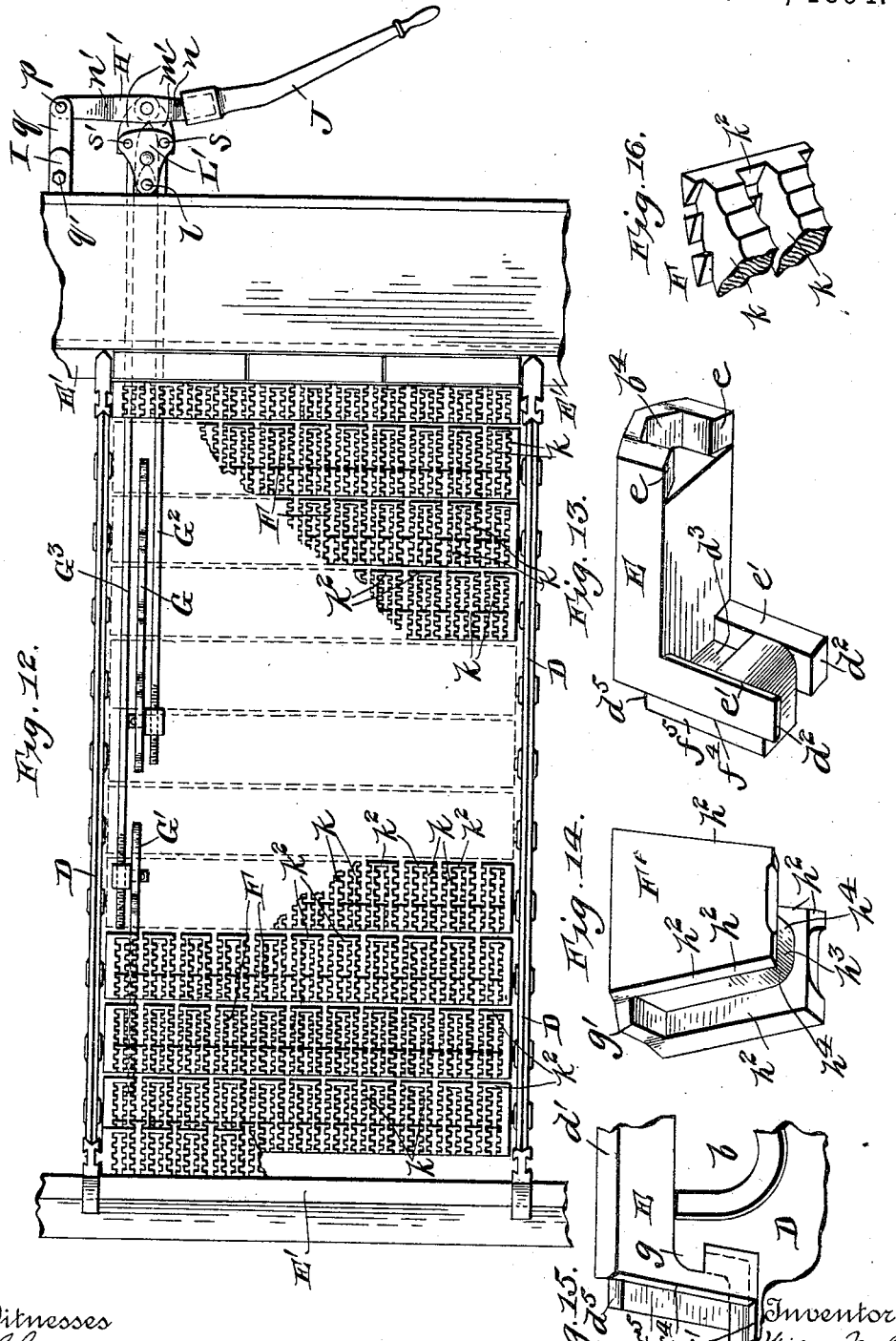
Witnesses
Severance
W. Harry Muzzy
Inventor
William McClave
by Mason, Fenwick & Lawrence
his Attorneys

UNITED STATES PATENT OFFICE.

WILLIAM McCLAVE, OF SCRANTON, PENNSYLVANIA.

GRATE FOR BOILER OR OTHER FURNACES.

SPECIFICATION forming part of Letters Patent No. 529,291, dated November 13, 1894.

Application filed May 25, 1894. Serial No. 512,459. (No model.)

*To all whom it may concern:*

Be it known that I, WILLIAM MCCLAVE, a citizen of the United States, residing at Scranton, in the county of Lackawanna and State of Pennsylvania, have invented certain new and useful Improvements in Grates for Boiler or other Furnaces; and I do hereby declare the following to be a full, clear, and exact description of the invention, such as will enable others skilled in the art to which it appertains to make and use the same.

My invention relates to grates used in boiler and other furnaces, and is especially useful in connection with those types of grates which are formed of bars adapted to rock so as to simply agitate the fuel on the grate, or to rock so as to both agitate the fuel on the grate, and form pockets for cutting out the débris; and the objects of the same are to provide for the construction of grate bar bearing bars with an upper or ridge portion in separate pieces practically throughout the entire length, while the lower portion or bearing bar proper is in one piece, whereby the grate bars can be journaled and locked in position against upward and downward movement and their journal ends covered and each piece of the ridge portion allowed freedom to expand and contract without liability of dangerously straining or warping the grate bar proper.

Another object is to improve the construction, arrangement and operation of the connecting rods or pitmen, twin-levers, handle operating lever and latching mechanism of rocking grate bars, whereby greater utility and convenience are afforded and space economized.

Another object is to provide a means for strengthening the fingers of rocking grate bars whereby that type of grate bar whose pendent portion is cut down at intervals along its upper edge and has fingers extending laterally from it on opposite sides of the said cut down portions, can have its fingers strengthened in series near their outer extremities and said fingers yet allowed freedom to expand and thus prevent warping or buckling of the said pendent portion of the grate bar.

Figure 1 is a vertical longitudinal section of a portion of a boiler furnace, the grate sections being partly in elevation and partly in section, and the bars lying in their normal position, the section being taken on one side of the ash pit door. Fig. 2 is a similar view, all the bars being in elevation, the grate bars having been rocked forward. Fig. 3 is a similar view, all the grate bars having been rocked backward. Fig. 4 is a similar view, the forward series of grate bars having been rocked backward. Fig. 5 is a similar view, the rear series of grate bars having been rocked backward. Fig. 6 is a side elevation of the grate bar journal-bearing bar, some of the locking caps and key plugs being removed. Fig. 7 is a plan view of the bar shown in Fig. 6. Fig. 8 is an enlarged broken detail view of the rear end of the bearing bar, the cap and key plug being in section. Fig. 9 is a detail view, in side elevation, of a portion of the bearing bar, one of the caps and key plugs being sectioned. Fig. 10 is a front view of a portion of the furnace, showing the operating twin stub levers and handle partially in section. Fig. 11 is a bottom plan view of the operating handle. Fig. 12 is a top plan view of the grate, a portion of the grate bars being broken away and the operating stub levers and pitmen being arranged in horizontal instead of vertical position as in other figures. Fig. 13 is a detail perspective view of one of the locking caps. Fig. 14 is a detail perspective view of one of the key plugs. Fig. 15 is a broken detail view showing a slight modification of the locking lugs, and Fig. 16 is a broken detail view of the front ends of the grate bar fingers.

A in the drawings designates either a boiler or other furnace, having an ash pit A' below its fire bed line B, and provided with doors as C, C', above and below said fire bed line, as usual.

D are the grate bar journal bearing bars arranged on strong end supports, E', E', in any of the usual ways. The journal bearing bars extend longitudinally the whole length of a fire bed and may be placed close to the side walls at intermediate points of the width of the furnace when the grate bed comprises more than one row of grate bars.

F are rocking and pocket-forming cut-out grate bars, provided with journal ends *a*.

The journal bearing bars are provided with journal bearing and locking cap notches *b* and key plug notches *c;* the former being practically semi-circular, their horizontal diameter being only a little greater than the diameters of the journal ends of the grate bars and their depth a trifle greater than the diameter of said journal ends. The key-plug notches $c$ are flared upwardly and in the main are straight and flat sided. The bar D at the points where the notches $b$ are formed is reduced in thickness upwardly so as to form narrow ridge portions $d$, and horizontally running beveled shoulders $f$, of equal width, on opposite sides of the respective ridge portions; the construction of the bar being such that base and end tongue portions $h$, $h'$, and locking lugs $g$ are formed for the retention of the locking caps E and the key plugs F' F$^2$; and on the other side of said notches $b$, at the points where the key-plug notches $c$ are formed, the bar D is made flat on top, and only extends up on said side to the height of the notches $b$; and from these lower portions the locking lugs $g$ project; said locking lugs being of a thickness equal to the ridge portions $d$ of the bar D, and of a depth about half that of the said lower portions of the bar. The tongue $h$ is formed on the bar, on a plane below the lugs $g$; said tongue as well as the tongue $h'$ being of a thickness equal to the ridge portions $d$. On each side of the tongue portions $h$, $h'$ beveled shoulders $f'$, $f^2$, $f^3$, are formed on the bar D. The shoulders $f'$ are below the tongue $h$, while the shoulders $f^2$ are formed at the forward termini of the notches $c$, and are inclined, extending up to the flat surface of the bar; and the shoulders $f^3$ are formed at the rear termini of the said notches $c$ and also are inclined and extend up to the bevel surface of the bar. Near one end of the bar D a key plug notch $c'$ may be provided as shown, for the reception of the keying plug F$^2$ especially adapted by its shape to conform to the particular grate bar bearing herein shown. This keying plug F$^2$ in all other respects as well as the notch for receiving it, is the same in construction as the keying plug F', and notch $c$. In connection with the bar thus described, the flanged tongued and recessed locking cap E and also the flanged and capped keying plugs F' F$^2$ are employed.

The locking caps are preferably of ridge form, as indicated at $d'$, and at one end, and on each side of their central portions, they are formed with beveled flanges $e$, which slide upon the beveled shoulders $f$ of the bar D, and at their other ends they are provided with vertical plugging portions formed with flanges $d^2$ which slide on the beveled shoulders $f'$. They are also provided with flanges $e'$ which are beveled on their front and rear edges. The front edges of these flanges nearly abut against the beveled inclined shoulders $f^2$ of the bar D. The bottoms of the central body portions of the caps have a close contact with and ride upon the portions $h$ of the bar D. The caps at their rear, are provided with tongues $f^5$, and at points corresponding to the location of the locking lugs $g$ on the bar D, they are provided with recesses $d^3$ adapted to receive the lugs $g$; and at their front upper ends capping portions $d^4$ are formed to overlap or cap the rear ends of the ridge portions $d$; and at the rear upper ends of the caps, portions $d^5$ are cut away so as to receive the capping portions $g'$ formed on the key plugs F'. The keying plugs F' are preferably of wedge form, and on each side of the central plugging portion beveled flanges $h^2$ are formed. These flanges extend forwardly and rearwardly beyond the central plugging parts of the key plugs, and also down to or nearly to the beveled shoulders $f'$ of the bar D; and they are so shaped as to pass down between the beveled shoulders $f^3$ and $f^4$ and rest or nearly so on said shoulders $f'$; and the central plugging portion is also so shaped that its bottom $h^3$ has a solid contact with the bottom or tongue portions $h$; but while this is so, the opposite upright end portions of the central key plugging portion, and the end portions of its flanges; and also the locking caps are constructed to have small spaces of either tapering or rectangular form between them, as indicated at $h^5$, $h^6$, and thus not come in contact with one another before being subjected to an intense heat; and by this means room for expansion of the cap and keying plugs, sufficient to prevent warping or buckling of the journal bearing bar proper, under the intense heat of the burning fuel on the grate, is afforded. The rocking grate bars are formed of fingers $k$ and solid pendent portions $k'$ cut down at intervals from their tops between the fingers as shown in my patent, No. 318,007, and at the front ends of the fingers, tie portions $k^2$ are cast, thus connecting two or more fingers of the grate bar together in a series. Spaces are left between the different series by omitting tie portions $k^2$. This construction allows of the fingers themselves springing sufficiently to permit of the expansion of the said ties without straining or warping the pendent solid parts of the grate bars F.

The rocking grate bars represented are adapted to form pockets for cutting out the débris in a manner well known in the art, and while my improvements in the journal bearing bars, as hereinbefore described, are especially important in connection with this type of grate bar, they may be used with other forms of rocking bars to advantage.

In Fig. 15 I have shown the locking lugs constructed to enter side recesses instead of a central recess, and I regard this the equivalent of the central recess.

The rocking grate bars are united in series by connecting bars G, G' one series of the rocking bars being connected by the solid pendent portions, through crank pins on lugs thereof, to the bar G, and the other series by similar means to the bar G'; and from the connecting bars, pitmen G$^2$, G$^3$, extend through the front of the furnace to twin stub or primary levers H, H' and are connected thereto by separate pivots $m$, $m'$. The pitmen are formed at their front ends with curved flattened portions $m^2$, said flattened portions being respectively formed wholly on one side of the center of the respective pitmen, and thus, when in proper position with respect to one another, the two flattened portions can occupy a space about equal to the diameter of a pitman. By this construction the pitmen can be arranged on the same plane or line with the fulcrum support I of the swinging straps of the stub or primary levers, and thus space is economized. The stub levers are formed with angular bends, as indicated at $n$, $n'$, and when placed side by side, an oblong space is formed between them for the ends of the pitmen to play in. The fulcrum end of each lever is connected by a separate pivot $p$ to a vibrating fulcrum strap $q$; and the two straps $q$ are connected by a fulcrum pin $q'$ to the stationary fulcrum support I, which projects from the furnace front. The straps $q$ are formed with angular bends $n^2$ and thus when they are placed side by side, room is afforded between them for the fulcrum ends of the stub levers to play in, while the other ends of the straps pass between the jaws of the bifurcated fulcrum support I and are so confined, that the stub levers are kept from spreading apart. On the furnace front, and centrally between the pitmen a stationary bracket or stud L is provided, and in this stud a round passage is formed. To the said stud a segmental stop plate L' is attached loosely by means of a pivot $l$, said pivot passing through the round passage of the stud and being adapted to be moved longitudinally of said passage for the purpose of making locking changes, by reason of its end, through which its fastening key is passed, extending some distance beyond the lug and the key passed down some distance from the lug and thus allowing play room for the pivot. The segmental plate is provided with two locking pins $s$, $s'$, applied respectively near the extreme outer corners of the plate, and at a sufficient distance apart to have the locking pins enter locking holes $s^2$, $s^3$, in the respective pitmen, and thus serve as means for holding either or both series of the grate bars level or in their normal position.

For operating both stub levers simultaneously, a handle J is provided, said handle being adapted for operating the levers separately or together. When both levers are operated together the whole grate is vibrated and a cut out of the débris thereof effected. The handle J has a socket formed in it and said socket is provided with two narrow central ribs or partial webs $t$ so that when this handle is used for moving either of the stub levers, for the purpose of operating either one or the other of the series of grate bars for effecting a cut out of the débris, any movement of the lever in the socket, will be prevented, while if the handle is used for operating both levers the levers will be united as one by means of said handle, and can be operated without any movement of either of the levers in the socket. By this construction cheapness and lightness in the handle are secured, metal being saved by making narrow ribs or sections of web in the socket instead of forming a continuous partition.

By means of the segmental stop plate L, the front series of grate bars can be held in normal position while the rear series is being operated or vice versa, it simply being necessary to slide the pivot of the segmental plate longitudinally of its passage until its key $l$ arrests the movement by coming in contact with the lug, and then swing the segmental plate on said pivot far enough to have one of its pins enter a hole in one or the other of the pitmen. The levers of the mechanism described may be arranged horizontally instead of vertically as illustrated in Fig. 12 of the drawings and the same advantage obtained.

By connecting the pitmen of the twin stub levers at points between the fulcrum-strap support and the point where the power is applied, the pitmen are elevated nearly to the plane of the bottom of the fire bed, and thus they are kept away from the destructive effects which would result from their moving in close proximity to a bank of hot clinkers and ashes and beyond the protecting effect of the body of fresh air which circulates between the clinker and ash bank and the grate, and while this is the case the inconvenience of placing the operating ends of the levers at a too great height with respect to the operator is avoided, which inconvenience is experienced when the fulcrum of the levers is located above the pitmen pivots.

By placing the pitmen and fulcrum strap supports, all in line, a more compact arrangement of the pair of levers is secured and they can be applied on furnace fronts when the spaces between the doors or at the sides of the doors are quite narrow.

What I claim as my invention is—

1. In a grate for boiler and other furnaces the combination with locking-journal bearing bars provided with notches, in pairs, which are separated for only a portion of their depth, of locking caps and key plugs; one notch of each pair of each bar serving for receiving the journal end of a grate bar and a portion of one of the locking caps, and the other for receiving another portion of said cap and one of the key plugs; and each of the said bearing bars being provided with one portion of the locking means, and the said caps with the other portion of the locking means; and the construction of the several parts of the combination being such that the horizontal portions of the locking caps serve for covering the journal ends of the grate bars and, with the key plugs, completing the upper portion of the bearing bars and keeping the grate bars properly in place, substantially as described.

2. In a grate the combination of rocking grate bars having journal ends, journal bearing bars provided with the portion of the locking means, removable locking caps also provided with a portion of the locking means, and key plugs for holding the caps locked; said plugs being constructed and arranged with respect to the journal bearing bars so as to be free with the cap to expand independently of the journal bearing bar, substantially as described.

3. In a grate, twin stub levers having angular bends, and placed side by side and having an oblong space between them, and connected respectively to devices for operating grate bars, at points above their fulcrum straps, by means of pitmen arranged in a plane or on a line with the fulcrum strap support, and having curved flattened ends formed by cutting away about half of the diameter of each pitman at the outer end, and provided with separate pivots, substantially as described.

4. In a grate, twin stub levers each having angular bends, placed side by side and forming an oblong space between them for the flattened ends of the pitmen to play in, substantially as described.

5. In a grate, the combination of the pitmen having flattened ends and separate pivots, twin stub levers having angular bends and forming an oblong space between them for the flattened ends of the pitmen to play in, and a pair of fulcrum straps to which the levers are connected, respectively, by separate pivots, said straps having angular bends, and forming a bifurcation for the lower ends of the levers to play in, and a bifurcated fulcrum strap-support, substantially as described.

6. In a grate the combination of a sliding and swinging stop latch provided with locking pins, and a pair of pitmen provided respectively with locking holes to receive the said pins and connected to devices for operating grate bars, substantially as described.

7. The combination with a rocking grate bar formed of fingers and a pendent solid portion, the upper edge of which is cut down below its top edge, between the fingers; ties between the fingers of at their front ends, said ties being applied so as to leave spaces between different series of fingers of the same bar, substantially as described.

In testimony whereof I hereunto affix my signature in presence of two witnesses.

WILLIAM McCLAVE.

Witnesses:
ROSCOE DALE,
H. A. KNAPP.